United States Patent
Mackey

(10) Patent No.: US 7,509,559 B2
(45) Date of Patent: Mar. 24, 2009

(54) APPARATUS AND METHOD FOR PARITY GENERATION IN A DATA-PACKING DEVICE

(75) Inventor: Richard P. Mackey, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 611 days.

(21) Appl. No.: 11/171,086

(22) Filed: Jun. 27, 2005

(65) Prior Publication Data

US 2006/0294447 A1 Dec. 28, 2006

(51) Int. Cl.
*H03M 13/00* (2006.01)

(52) U.S. Cl. .................. 714/758; 714/47; 714/48; 714/753; 714/755; 714/801

(58) Field of Classification Search .............. 714/48, 714/758, 801, 47, 52, 57, 753, 755
See application file for complete search history.

(56) References Cited

U.S. PATENT DOCUMENTS

| | | | | |
|---|---|---|---|---|
| 4,429,391 A | * | 1/1984 | Lee | 714/800 |
| 5,452,429 A | * | 9/1995 | Fuoco et al. | 714/6 |
| 5,859,990 A | * | 1/1999 | Yarch | 710/33 |
| 6,543,028 B1 | * | 4/2003 | Jamil et al. | 714/800 |
| 6,813,734 B1 | * | 11/2004 | Bhardwaj | 714/48 |
| 7,134,068 B2 | * | 11/2006 | Silvus et al. | 714/798 |
| 7,240,277 B2 | * | 7/2007 | Anderson et al. | 714/805 |
| 7,310,762 B2 | * | 12/2007 | Lesartre | 714/752 |
| 2004/0064600 A1 | * | 4/2004 | Lee et al. | 710/22 |
| 2006/0242540 A1 | * | 10/2006 | Cherian et al. | 714/766 |

* cited by examiner

*Primary Examiner*—Esaw T Abraham
(74) *Attorney, Agent, or Firm*—Blakely, Sokoloff, Taylor & Zafman LLP

(57) ABSTRACT

A data-packing device, such as a direct memory access controller (DMA), aligns data at a granularity smaller than an error protected unit (EPU) encoded by an error correction code (ECC) in the memory. For example, the data alignment is at a double-word level or a byte level. The data-packing device reads data from the memory, shifting the data, and marks a good data unit as corrupted if the data unit constitutes a fractional portion of a corrupted EPU. The marking of the data unit is performed by inverting a parity bit of the data unit.

18 Claims, 4 Drawing Sheets

APPARATUS AND METHOD FOR PARITY GENERATION IN A DATA-PACKING DEVICE

BACKGROUND

1. Field of the Invention

Embodiments of the invention relates to fault tolerant data computing. Specifically, embodiments of the invention relates to parity bit generation in a data-packing device.

2. Background

The demand has increased dramatically for high performance server-class chip sets. Critical data typically has low tolerance for errors; in some scenarios, even a single bit error in the data may wreak havoc. For example, financial data stored on the servers of a financial institution may be extremely sensitive to errors as any bit error in a dollar amount may incur great financial loss to the institution and its clients.

Electronic devices are generally susceptible to single event upsets (SEUs). SEUs are caused by impinging alpha particles which temporarily invert one or more data bits in memory cells or logic. The error is not permanent in that the underlying hardware is normally not harmed. However, any uncorrected bit error may propagate along the data computation and transmission path, rendering the entire data sequence in error. Thus, protecting critical data against the SEUs is crucial in noisy environments like large arrays of processors, server farms, telecom sites, and non-lead lined rooms.

Most systems include fault tolerant logic to protect stored data against the SEUs. The fault tolerant logic typically adopts an industry-standard scheme to implement an error checking and correction code (ECC). The ECC encodes an error protected unit (EPU) and records the encoded data in redundant bits associated with the EPU. An EPU may be any unit of bits; for example, a word, a double-word (Dword), or a quad-word (Qword). The redundant bits allow data detection or recovery in the case of an error occurring to the associated EPU. The number of bits detectable or correctable by a given ECC is dependent on the number of redundant bits and the size of the EPU. For example, an industry-standard ECC using 8 redundant bits for each 64-bit Qword may detect a double-bit error or correct a single-bit error. Before an EPU is sent to a device requesting the EPU, error checking and correcting logic in the memory controller checks the integrity of the data and corrects any correctable error. If an uncorrectable error is detected, the error checking and correcting logic marks the EPU as corrupted before sending it to the requesting device.

The SEUs may also occur on transmission wires and logic that carry data from one device to another. However, sending an ECC-protected EPU throughout the transmission path can be costly as the redundant bits occupy non-negligible bandwidth. Thus, a parity bit may be used outside of the memory to substitute for the multiple ECC bits. A parity bit may be used to detect the presence of a single bit error in a data unit of any length, for example, a byte, a word, a Dword, or a Qword. However, a parity bit is unable to correct a single bit error because it cannot locate the error. Further, a parity bit is unable to detect the presence of a double-bit error in an EPU because the effects of the two bit errors on the parity cancel each other. The double-bit error typically occur by two consecutive SEUs each upsetting one bit. Unless the two bit-errors occur in the same data bit, which is statistically almost impossible, both bit errors will be masked by a valid parity bit. Thus, the data in the EPU will be mistakenly treated as good and the errors will propagate to the downstream logics.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
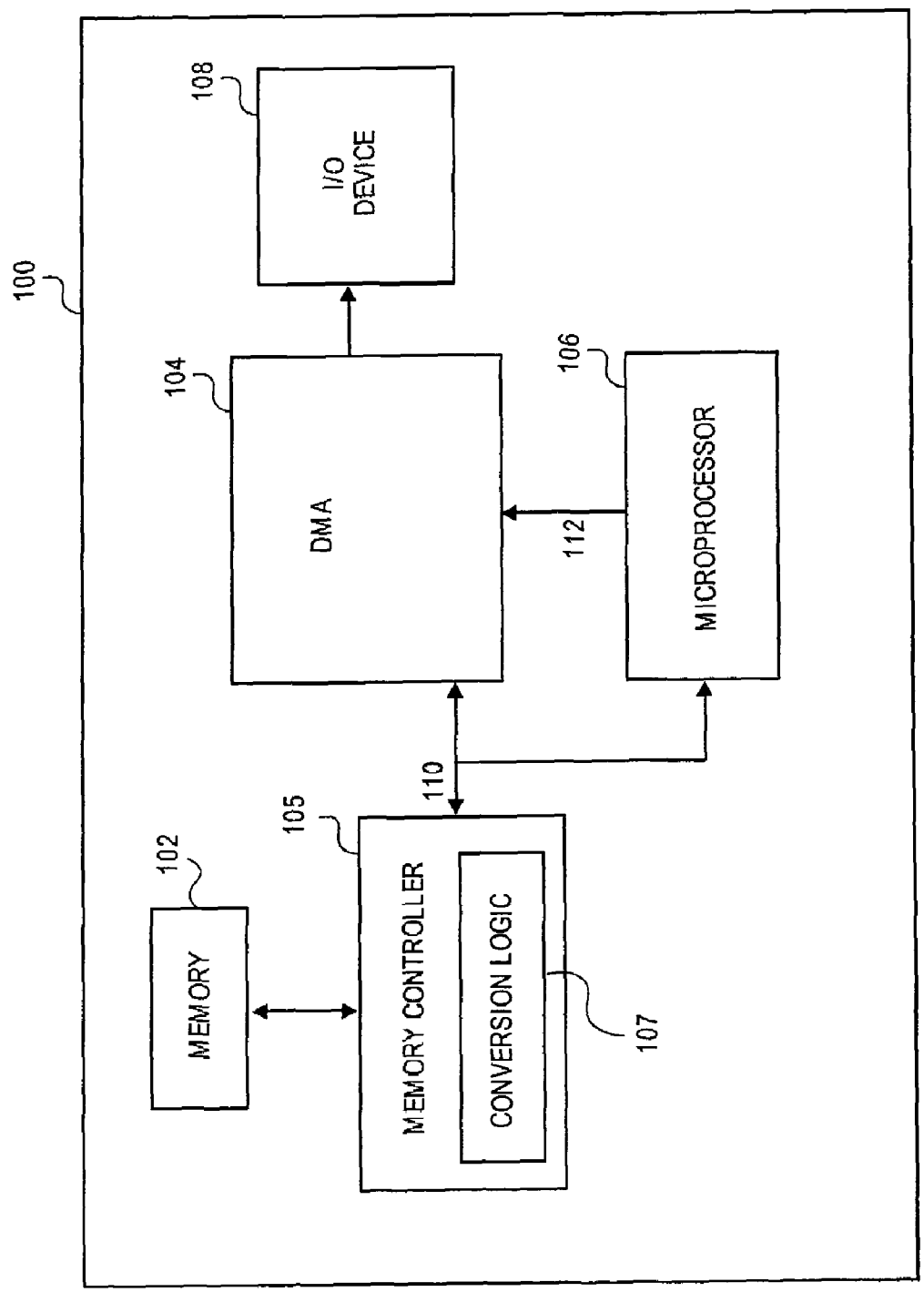
FIG. 1 is an embodiment of a system including a direct memory access controller (DMA)

FIG. 1 illustrates an embodiment of a system 100 including a microprocessor 106, memory 102, and a data-packing device such as a direct memory access controller (DMA) 104. The DMA 104 may read data from one or more locations in the memory 102 via a memory bus 110, and pack the data into a format suitable for downstream applications or storage. The DMA 104 may pack the data by, for example, aligning, shifting, and concatenating. The output of the DMA 104 may be connected to downstream logics (e.g., an I/O device 108) or back to the memory 102 for future use. The DMA 104 may be directly configured by the microprocessor 106 via a direct connection 112. Alternatively, the DMA 104 may read from the memory 102 the configuration data placed by the microprocessor 106. The DMA 104 may be implemented on a single chip. In one embodiment, the memory 102 may be a dual inline memory module (DIMM) having a 64-bit data path. Alternatively, the memory 102 may be a SDRAM, a flash memory, or any internal or external memory.

Data stored in the memory 102 may be protected by an error correction code (ECC). In one embodiment, each 64 bits of data (e.g., a Qword) in the memory 102 forms an error protected unit (EPU). Each EPU is associated with an 8-bit ECC. The 8-bit ECC detects any double-bit error or corrects any single-bit error in the associated Qword.

In one embodiment, the 8-bit ECC is converted to a number of parity bits, where the number is smaller than eight, before the Qword is read from the memory 102. The conversion saves bandwidth and capacity of the downstream wires and logics because of the fewer number of bits used and less complicated encoding/decoding logic involved for the parity bits. In one embodiment, the number of the converted parity bits is two. That is, each Qword is divided into two Dwords, and each of the Dwords is assigned a parity bit.

The conversion of the ECC to parity starts with error checking. In one embodiment, a conversion logic 107 in the memory controller 105 checks the 8-bit ECC to determine if there is an error in the associated Qword. If the conversion logic 107 determines that there is a single bit error, the error is corrected. The conversion logic 107 computes a parity bit for each of the two Dwords forming the Qword and appends the parity bit to each Dword. The two Dwords and the parity bits are then sent to the DMA 104 via the memory bus 110.

If the conversion logic 107 determines that a double-bit error is present in the Qword, the two Dwords constituting the Qword are both marked as corrupted. As the 8-bit ECC does not locate the double error bits, both Dwords are marked as corrupted even though only one Dword may be actually corrupted. Thus, the conversion logic 107 ensures that the two Dwords are either both marked as corrupted, or both marked as good. When marking a good Dword, the conversion logic 107 computes a parity bit for the Dword and appends the parity bit to the Dword. When marking a corrupted Dword, the conversion logic 107 computes a parity bit for the Dword, inverts the parity bit, and appends the inverted parity bit to the Dword. Thus, the downstream logic that receives the Dword will be on notice of the presence of error upon checking the parity bit associated with the Dword.

In one embodiment, the parity bit may be computed by an exclusive-OR (XOR) logic. When assigning a parity bit to a Dword, an XOR logic with a 33-bit input may be used. Out of the 33 bits, 32 bits are connected to each bit of the Dword, and the additional bit is connected to either a logical 1 or a logical 0. For the even parity scheme, the additional bit is connected to 0 so that the resulting parity bit and the associated Dword have an even number of 1's. For the odd parity scheme, the additional bit is connected to 1 so that the resulting parity bit and the associated Dword have an odd number of 1's.

In one embodiment where the even parity scheme is used, the inverted parity bit may be directly computed by a 33-bit XOR with the 32 bits connected to the Dword and the additional bit connected to a logical 1. For the odd parity scheme, the inverted parity bit may be directly computed by a 33-bit XOR with the additional bit connected to a logical 0.

Figure 2:
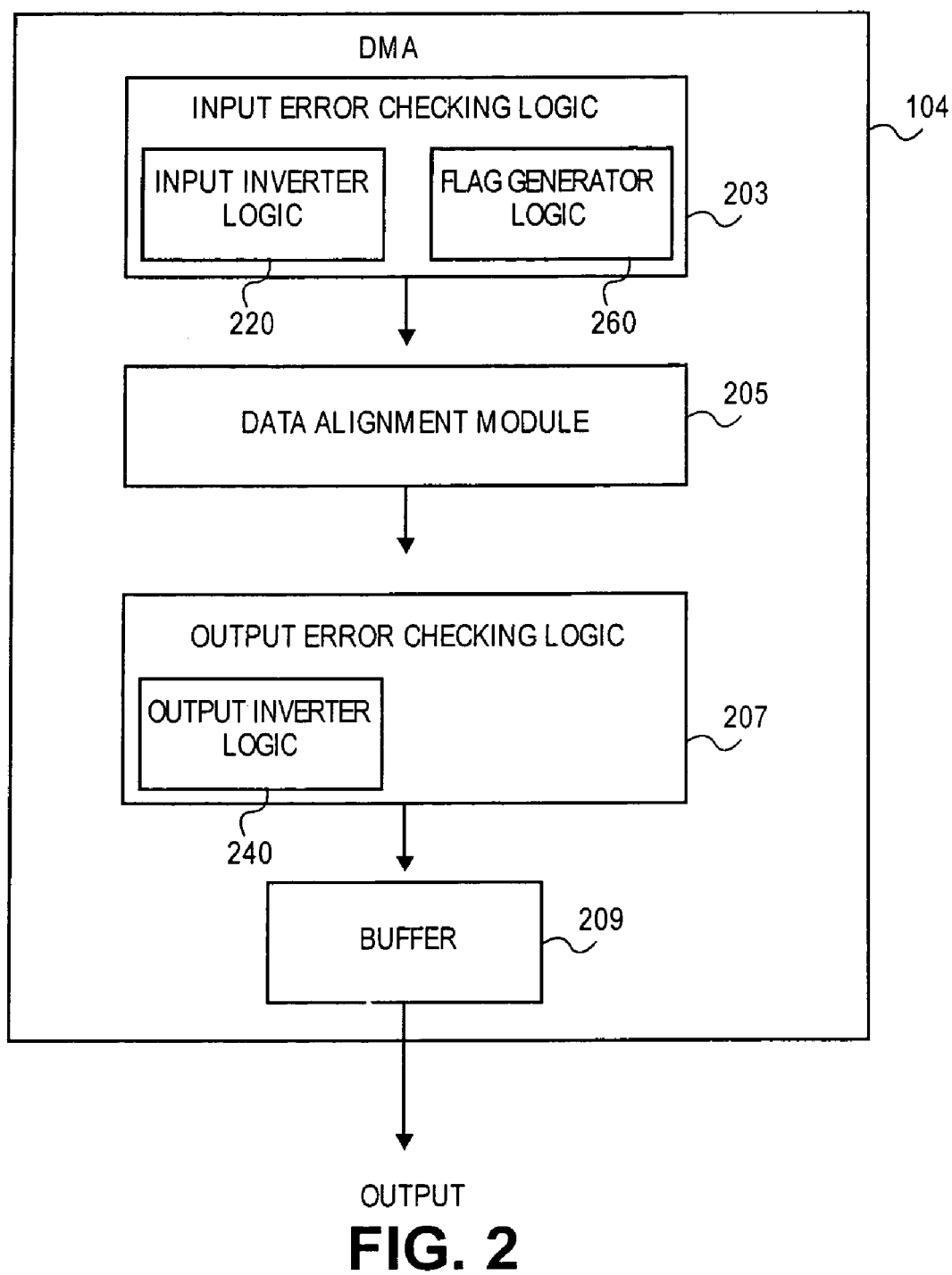
FIG. 2 is a functional diagram of the DMA.

FIG. 2 illustrates an embodiment of the DMA 104. The DMA 104 includes an input error checker 203, a data alignment module 205, an output error checker 207, and a buffer 209. The input error checker 203 checks the parity bits of the two incoming Dwords received from the memory 102. The input error checker 203 checks the parity bits by recomputing a parity bit for each Dword. If the recomputed parity bit is different from the incoming parity bit, the Dword has a bad parity bit. The bad parity bit indicates that the Dword either has been corrupted by an SEU, or is part of a corrupted Qword.

In one embodiment, the input error checker 203 recomputes the parity bit by feeding the incoming Dword and the associated incoming parity bit into a 33-bit XOR logic. An output of "1" from the XOR logic indicates that there is an odd number of "1" in the 33-bit input. Similarly, an output of "0" indicates that there is an even number of "1" in the 33-bit input. Thus, the input error checker 203 may determine whether the incoming parity bit is good or bad according to the parity scheme in use simply by checking the output of the XOR.

If only one of the two incoming Dwords has a bad parity bit, one of the two likely scenarios has occurred. In the first scenario, both Dwords were marked as good before leaving the memory 102 but one Dword was corrupted before reaching the input error checker 203. This may occur if the Dword is corrupted by an SEU on the memory bus 110. In the second scenario, both Dwords were marked as corrupted before leaving the memory 102, but subsequently one Dword was corrupted for the second time. The second corruption may occur anytime between the parity bit is computed in the memory 102 and checked in the input error checker 203. The parity bit of the twice-corrupted Dword falsely indicates that the Dword is good because the effect of the second error masks the effect of the first error on the parity bit.

The input error checker 203 does not distinguish the above two scenarios or determine which Dword is actually corrupted. Rather, the input error checker 203 ensures data integrity by flagging all possible errors. Thus, when only one of the two incoming Dwords has a bad parity bit, an input inverter logic 220 of the input error checker 203 inverts the good parity bit of the other Dword in the same Qword. The input inverter logic 220 may be integrated into the 33-bit XOR as described above in regard to the conversion logic 107 or implemented as a separate inverter unit.

Although each parity bit is associated with a Dword, one may view each Qword as protected by two parity bits. This is because in the absence of errors, the two parity bits associated with the Dwords in the same Qword should reflect the parity of the Dwords. If either parity bit is bad, the entire Qword is likely corrupted and should be marked as such by both parity bits.

In one embodiment, the data alignment module 205 aligns data by shifting the data either upwards or downwards according to the configuration data programmed into the DMA 104 or placed in the memory 102. Thus, the data alignment module 205 operates as a data shifter that shifts incoming data to produce data output to the output error checker 207. In one embodiment, the data alignment may be performed at any data granularity, for example, a Dword, a word, a byte, or a bit. After the alignment, the output error checker 207 checks the parity bits of the shifted data and updates the parity bits if necessary. Similar to the input error checker 203, the output error checker 207 ensures that the two Dwords in a Qword after the shifting are either both marked as corrupted or both marked as good. This is because when only one of the two Dwords has a good parity bit, the downstream logic is unable to distinguish whether the good parity bit truly indicates a good Dword, or is masked by two consecutive SEUs, or was originally bad and has been corrupted by a single SEU.

Thus, when only one of the two Dwords has a bad parity bit, an output inverter logic 240 of the output error checker 207 inverts the good parity bit of the other Dword in the same Qword. The output inverter logic 240 may be implemented in the same way as the input inverter logic 220. After the shifted data are properly marked, the buffer 209 temporarily stores the shifted data before sending the data to the downstream logic.

Figure 3:
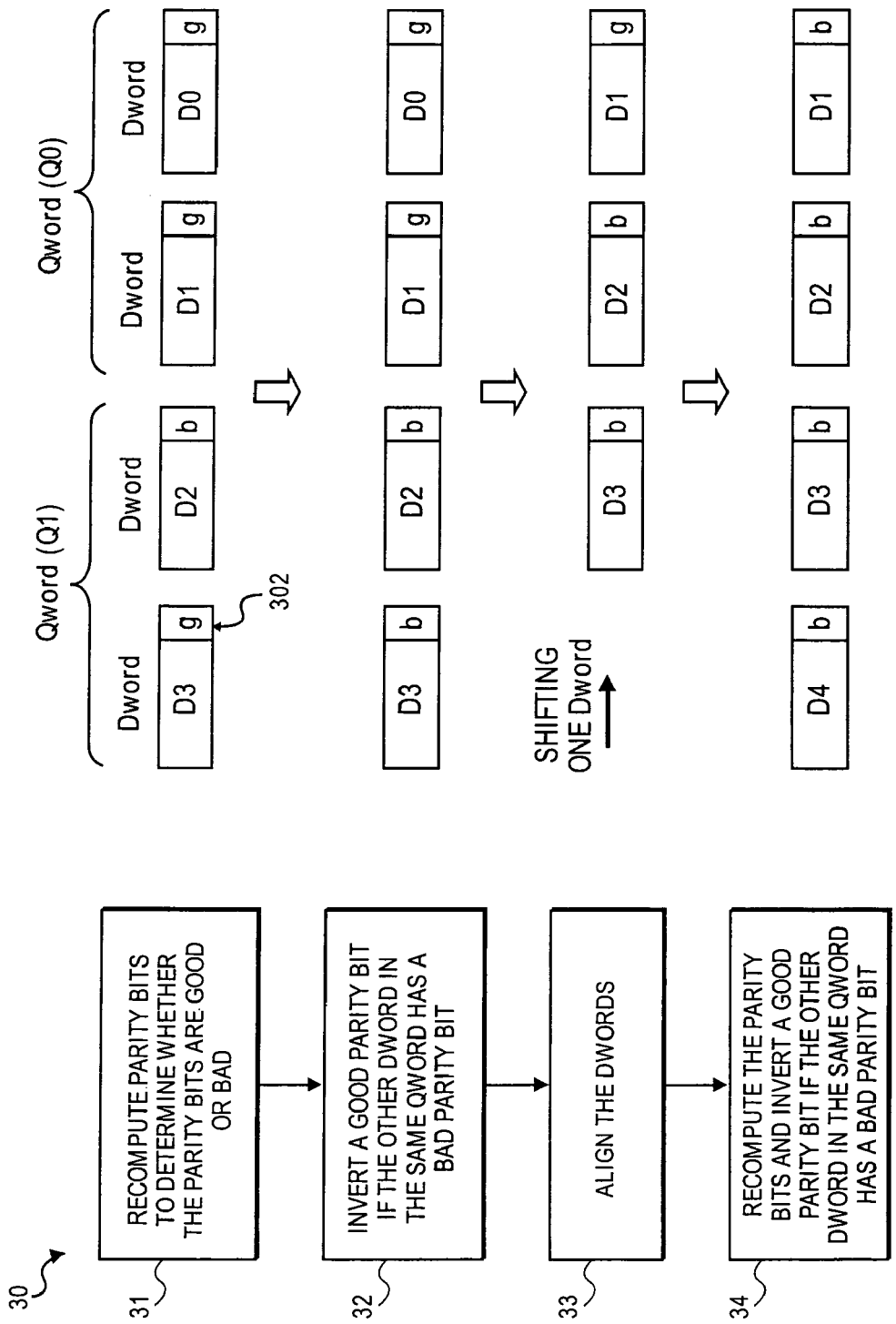
FIG. 3 is an example of fault-tolerant computing performed by the DMA at a Dword level.

In one embodiment, the data alignment module 205 shifts the data at a Dword level. That is, the data is shifted by an integer multiple of a Dword. FIG. 3 shows an example of the DMA 104 performing parity updating and data shifting on four Dwords (D3, D2, D1, D0) at a Dword level. FIG. 3 also includes a flowchart 30 showing the DMA operations performed for each corresponding row of Dwords. In the example, (D3, D2) constitute a Qword Q1 and (D1, D0) constitute a Qword Q0. Each of the D3, D2, D1, D0 has an associated parity bit appended thereto. For example, D3 is associated with a parity bit 302 labeled by "g." For the purpose of illustration, a "g" in the party bit indicates a good parity bit and a "b" indicates a bad parity bit.

At block 31, the input error checker 203 checks the parity bits of (D3, D2, D1, D0) by recomputing the parity bits and comparing the results against the received parity bits. The input error checker 203 marks the parity bits as either good or bad according to the comparison results. In this example, the comparison results show that D2 has a bad parity bit and D3, D1, and D0 have good parity bits. At block 32, the input error checker 203 inverts the parity bit of D3 because the other Dword in Q1 (i.e., D2) is bad. The input error checker 203 does nothing to the parity bits of D1 and D0 because both of the two Dwords in Q0 have good parity bits. At block 33, the data alignment module 205 shifts (D3, D2, D1, D0) downward by one Dword. Thus, (D4, D3) constitute Q1 and (D2, D1) constitute Q0. For the purpose of illustration, assume that D4 has a good parity bit. Thus, as a result of the shifting, the corrupted Dwords (D3, D2) are moved past the Qword boundary, causing both Q1 and Q0 to have one corrupted Dword and one good Dword. At block 34, the output error checker 207 checks the parity bits of (D4, D3, D2, D1) and inverts the parity bits of D4 and D1 to mark them as corrupted. Thus, all four Dwords (D3, D2, D1, D0) are marked as corrupted.

Figure 4:
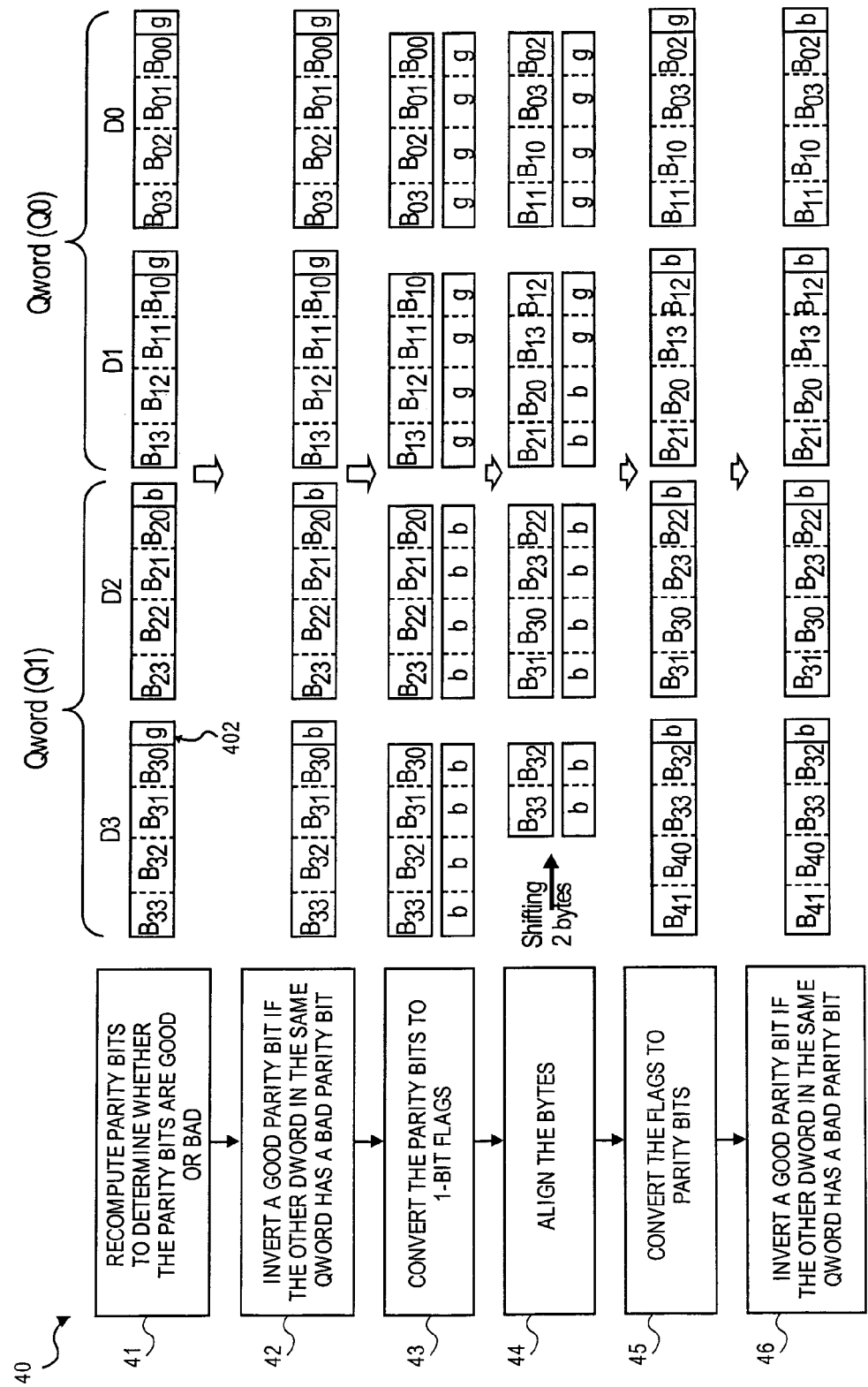
FIG. 4 is an example of fault-tolerant computing performed by the DMA at a byte level.

In another embodiment as illustrated in FIG. 4, the data alignment module 205 shifts the data at a byte level. FIG. 4 also includes a flowchart 40 showing the DMA operations performed for each corresponding row of bytes. In FIG. 4, the data alignment module 205 shifts the four Dwords (D3, D2, D1, D0) downward by two bytes. Each of the Dwords (D3, D2, D1, D0) includes four bytes and is associated with a parity bit. For example, D3 includes ($B_{33}$, $B_{32}$, $B_{31}$, $B_{30}$) and is associated with a parity bit 402 labeled by "g."

At block 41, the input error checker 203 recomputes the parity bits to determine whether the parity bits are good or bad. In the example as shown, D2 has a bad parity bit and D3, D1, D0 have good parity bits. At block 42, the input error checker 203 inverts the parity bit of D3 because the other Dword in Q1 (i.e., D2) has a bad parity bit.

At block 43, a flag generator logic 260 of the input error checker 203 converts each parity bit into four 1-bit flags, with each flag associated with one byte. A good parity bit is converted to four good flags, and a bad parity bit is converted to four bad flags, which are inverted good flags. The flag is not a parity bit of a byte. Rather, the flag is a replication of the good or bad status of the Dword that contained the byte. In an alternative embodiment, each 1-bit flag may be duplicated so that more than one 1-bit flag is assigned to each byte. The flag duplication enhances data protection against the SEUs by redundancy. In another embodiment, the parity bit-to-flag conversion may be directly computed without first inverting the parity bit at block 42. Thus, a bad flag may be set when either Dword in the Qword containing the associated byte has a bad parity bit. Thus, block 42 may be bypassed and the inversion of the parity bit may be merged into the parity bit-to-flag conversion at block 43.

After the parity bit-to flag-conversion, at block 44, the data alignment module 205 shifts the data downwards by two bytes. At block 45, the output error checking module 207 converts each of the four flags associated with a Dword into a good/bad bit for that Dword. If any of the four flags is bad, the converted parity bit is inverted. At block 46, the output error checking module 207 checks the parity bits to ensure that the Dwords in a Qword are either both good or both bad. Thus, the parity bit of D0 is inverted to mark D0 as bad because D1 has a bad parity bit. Alternatively, the output error checking module 207 may directly compute the two parity bits for each Qword from the flags, thus bypassing block 45. If any byte in a Qword is marked by a bad flag, the output error checking module 207 marks both parity bits of the Qword as bad.

In an alternative embodiment, the data alignment module 205 may shift the data at a level of any data length. For example, if the data alignment module 205 shifts the data at a half-byte level, a 1-bit flag may be assigned to each of the half-bytes. The computations performed by the input error checking module 203, data alignment module 205, and the output error checking module remain the same as illustrated by the flowchart 40 of FIG. 4.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
    an input error checker in a direct memory access controller (DMA) of a computing device to receive a corrupted error protected unit (EPU) and an adjacent uncorrupted EPU from memory of the computing device, wherein each of the corrupted EPU and the adjacent uncorrupted EPU is associated with a respective error correct code (ECC) and comprises a plurality of data units;
    a data shifter in the DMA, the data shifter coupled to the input error checker to receive the corrupted EPU and the adjacent uncorrupted EPU, the data shifter to shift the corrupted EPU and the adjacent uncorrupted EPU by a fractional portion of an EPU in the direction of the adjacent uncorrupted EPU to generate two shifted EPUs; and
    an output error checker in the DMA, the output error checker coupled to the data shifter to receive the two shifted EPUs and mark all of the data units in the two shifted EPUs as corrupted.

2. The apparatus of claim 1 wherein the input error checker further comprises logic to mark an uncorrupted data unit in the corrupted EPU as corrupted before the corrupted EPU is sent to the data shifter.

3. The apparatus of claim 2 wherein each of the input error checker and the output error checker comprises:
    inverter logic to invert a parity bit associated with the uncorrupted data unit to mark the uncorrupted data unit as corrupted.

4. The apparatus of claim 2 wherein the input error checker comprises:
    flag generator logic to convert a parity bit associated with each the data units in the corrupted EPU and the adjacent uncorrupted EPU into a plurality of data flags, each of the data flags being associated with a data sub-unit.

5. The apparatus of claim 4 wherein the output error checker is to convert the plurality of data flags into the parity bit.

6. The apparatus of claim 4 wherein the data shifter is to shift data at a byte level and the data sub-unit is a byte.

7. A method comprising:
    receiving, at a direct memory controller (DMA) of a computing device, a corrupted error protected unit (EPU) and an adjacent uncorrupted EPU from memory of the computing device, each of the corrupted EPU and the adjacent uncorrupted EPU being associated with a respective error correct code (ECC) and comprising a plurality of data units;
    shifting, within the DMA, the corrupted EPU and the adjacent uncorrupted EPU by a fractional portion of an EPU in the direction of the adjacent uncorrupted EPU to generate two shifted EPUs; and
    marking, within the DMA, all of the data units in the two shifted EPUs as corrupted.

8. The method of claim 7 further comprising:
    marking an uncorrupted data unit in the corrupted EPU as corrupted before shifting the corrupted EPU and the adjacent uncorrupted EPU.

9. The method of claim 8 wherein marking an uncorrupted data unit comprises:
    inverting a parity bit associated with the uncorrupted data unit to mark the uncorrupted data unit as corrupted.

10. The method of claim 7 wherein shifting the corrupted EPU and the adjacent uncorrupted EPU further comprises:
    converting a parity bit associated with each of the data units in the corrupted EPU and the adjacent uncorrupted EPU into a plurality of data flags, each of the data flags being associated with a data sub-unit.

11. The method of claim 10 wherein converting a parity bit further comprises:
converting the plurality of data flags into the parity bit after shifting the corrupted EPU and the adjacent uncorrupted EPU.

12. The method of claim 10 wherein the data sub-unit is a byte and wherein the shifting comprises:
shifting data at a byte level.

13. A system comprising:
memory of a computing device to store a plurality of error-protected units (EPUs), each EPU protected by an error protection code;
a direct memory controller (DMA) of the computing device, the DMA coupled to the memory and comprising:
an input error checker to receive a corrupted EPU and an adjacent uncorrupted EPU from the memory, wherein each of the corrupted EPU and the adjacent uncorrupted EPU is associated with a respective error correct code (ECC) and comprises a plurality of data units;
a data shifter coupled to the input error checker to receive the corrupted EPU and the adjacent uncorrupted EPU, the data shifter to shift the corrupted EPU and the adjacent uncorrupted EPU by a fractional portion of an EPU in the direction of the adjacent uncorrupted EPU to generate two shifted EPUs; and
an output error checker coupled to the data shifter to receive the two shifted EPUs and mark all of the data units in the two shifted EPUs as corrupted.

14. The system of claim 13 further comprising:
a microprocessor to configure the data shifter; and
wherein the input error checker further comprises logic to mark an uncorrupted data unit in the corrupted EPU as corrupted before the corrupted EPU is sent to the data shifter.

15. The system of claim 14 wherein each of the input error checker and the output error checker comprises:
inverter logic to invert a parity bit associated with the uncorrupted data unit to mark the uncorrupted data unit as corrupted.

16. The system of claim 13 wherein the input error checker comprises:
flag generator logic to convert a parity bit associated with each of the data units in the corrupted EPU and the adjacent uncorrupted EPU into a plurality of data flags, each of the data flags being associated with a data sub-unit.

17. The system of claim 16 wherein the output error checker is to convert the plurality of data flags into the parity bit.

18. The system of claim 16 wherein the data shifter is to shift data at a byte level and the data sub-unit is a byte.

* * * * *